US010171312B2

(12) United States Patent
Kannan et al.

(10) Patent No.: US 10,171,312 B2
(45) Date of Patent: Jan. 1, 2019

(54) OPTIMIZING CLOUD SERVICE DELIVERY WITHIN A CLOUD COMPUTING ENVIRONMENT

(71) Applicant: International Business Machines Corporation, Armonk, NY (US)

(72) Inventors: Kalapriya Kannan, Bangalore (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 14/582,360

(22) Filed: Dec. 24, 2014

(65) Prior Publication Data

US 2016/0191342 A1   Jun. 30, 2016

(51) Int. Cl.
*H04L 12/24*   (2006.01)

(52) U.S. Cl.
CPC ...... *H04L 41/5009* (2013.01); *H04L 41/5025* (2013.01)

(58) Field of Classification Search
CPC . H04L 41/5009; H04L 41/5025; H04L 67/10; H04L 67/34; H04L 41/5054; H04L 67/16; H04L 65/80; H04L 67/148; H04L 41/50; H04L 41/5041; G06Q 30/0206; G06Q 10/06
USPC ......................................................... 709/226
See application file for complete search history.

(56) References Cited

U.S. PATENT DOCUMENTS

| | | | | |
|---|---|---|---|---|
| 2011/0138050 A1* | 6/2011 | Dawson | ................ | G06F 9/5072 709/226 |
| 2011/0295986 A1* | 12/2011 | Ferris | .................... | G06F 9/5072 709/222 |
| 2012/0151061 A1* | 6/2012 | Bartfai-Walcott | .... | G06F 9/4856 709/226 |
| 2012/0173708 A1* | 7/2012 | Bartfai-Walcott | .... | G06F 9/5072 709/224 |
| 2012/0290348 A1* | 11/2012 | Hackett | .................. | G06Q 10/06 705/7.13 |
| 2014/0040889 A1* | 2/2014 | Baset | ...................... | G06F 9/455 718/1 |
| 2014/0068053 A1* | 3/2014 | Ravi | ..................... | G06F 9/5072 709/224 |
| 2014/0115162 A1* | 4/2014 | Kalyanaraman | ........................... | H04L 29/08954 709/226 |

(Continued)

*Primary Examiner* — Oleg Survillo
*Assistant Examiner* — Imran Moorad
(74) *Attorney, Agent, or Firm* — Ryan, Mason & Lewis, LLP

(57) ABSTRACT

Embodiments of the invention provide systems, methods and computer program products for optimizing cloud service delivery within a cloud computing environment. A cloud service request (CSR) is received from a cloud customer in the cloud computing environment, the CSR comprising at least one parameter of one or more existing cloud services accessed by the cloud customer that are provided by one or more existing cloud service providers. At least one parameter of the CSR is monitored in a cloud service registry comprising a plurality of cloud services provided by a plurality of cloud service providers and one or more parameters corresponding to each cloud service of the plurality of cloud services. Based on the monitoring, a new cloud service provider is determined who may provide a better cloud service with respect to the at least one parameter in the CSR being monitored.

12 Claims, 6 Drawing Sheets

(56) References Cited

U.S. PATENT DOCUMENTS

| | | | |
|---|---|---|---|
| 2014/0278807 A1* | 9/2014 | Bohacek | G06Q 30/0206 705/7.35 |
| 2015/0268935 A1* | 9/2015 | Muntes | G06F 8/20 717/105 |
| 2016/0119357 A1* | 4/2016 | Kinsella | H04L 63/102 726/1 |

* cited by examiner

OPTIMIZING CLOUD SERVICE DELIVERY WITHIN A CLOUD COMPUTING ENVIRONMENT

FIELD

The present application generally relates to cloud computing. Specifically, the present application relates to the optimization of cloud services delivery within a cloud computing environment.

BACKGROUND

With the increase in popularity of cloud computing, there has been a commensurate increase in the number of vendors that provide cloud-based computing services, and the number of vendors is expected to continue to grow. After a user has subscribed to utilize services of a cloud services provider or vendor (through a service level agreement (SLA), for example), the user may be obligated to continue utilizing the cloud services of the vendor for the agreed duration of time. However, there is a possibility of other vendors arriving in the market providing the same or better services at a lesser cost after the SLA has been signed. However, the user may not be inclined to keep track of such opportunities, especially if the vendor is providing services as per the agreed SLA terms and the user is satisfied. Moreover, the migration of cloud services from one vendor to another may be presumed or perceived to be cumbersome.

SUMMARY

According to embodiments of the present invention, there is provided a system, method and computer program product for optimizing cloud service delivery within a cloud computing environment. A cloud service request (CSR) is received from a cloud customer in the cloud computing environment, the cloud service request comprising at least one parameter of one or more existing cloud services accessed by the cloud customer that are provided by one or more existing cloud service providers. At least one parameter of the CSR is monitored in a cloud service registry comprising a plurality of cloud services provided by a plurality of cloud service providers and one or more parameters corresponding to each cloud service of the plurality of cloud services. Based on the monitoring, a new cloud service provider is determined who may provide a better cloud service with respect to the at least one parameter of the CSR being monitored. Based on the determining, it may be suggested to the cloud customer that the existing cloud service be migrated to the new cloud service provider.

BRIEF DESCRIPTION OF THE SEVERAL VIEWS OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Figure 1:
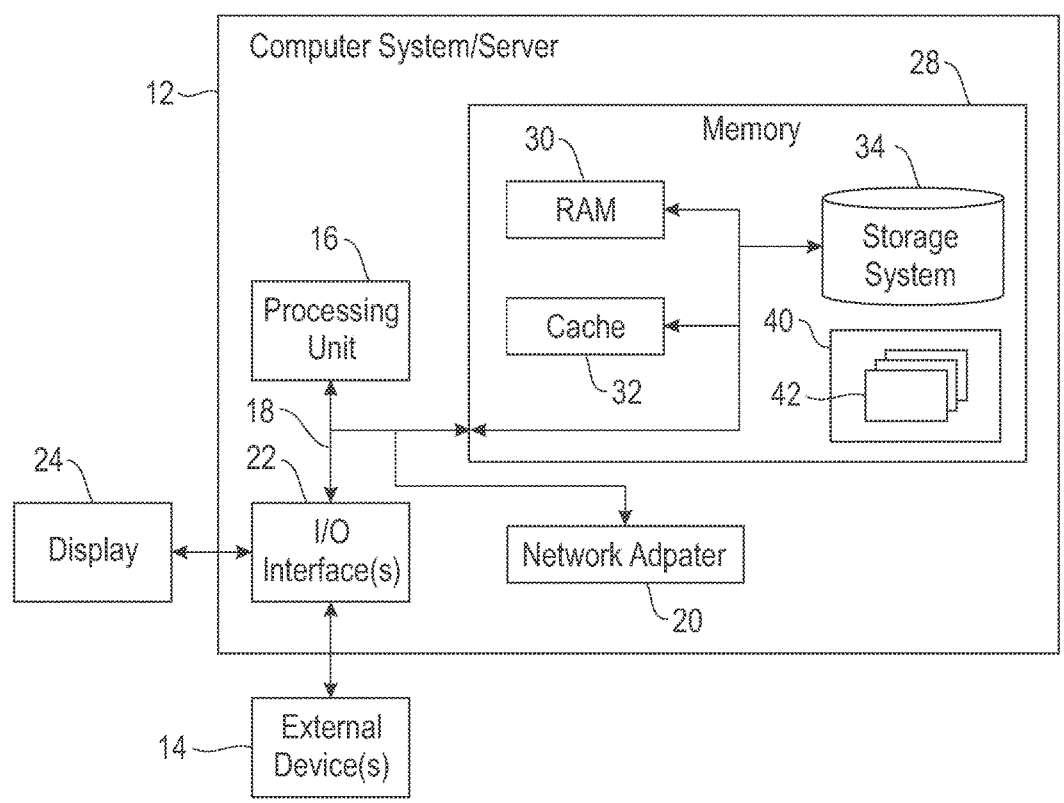
FIG. 1 shows a cloud computing node, according to an embodiment of the present invention.

One or more embodiments of the invention will be described in more detail with reference to the accompanying drawings, in which the preferable embodiments of the present disclosure have been illustrated. However, the present disclosure can be implemented in various ways, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on premise or off-premise.

Community cloud: the cloud infrastructure is shared by several organizations and supports a specific community that has shared concerns (e.g., mission, security requirements, policy, and compliance considerations). It may be managed by the organizations or a third party and may exist on premise or off-premise.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, and data archival storage systems, etc.

Figure 2:
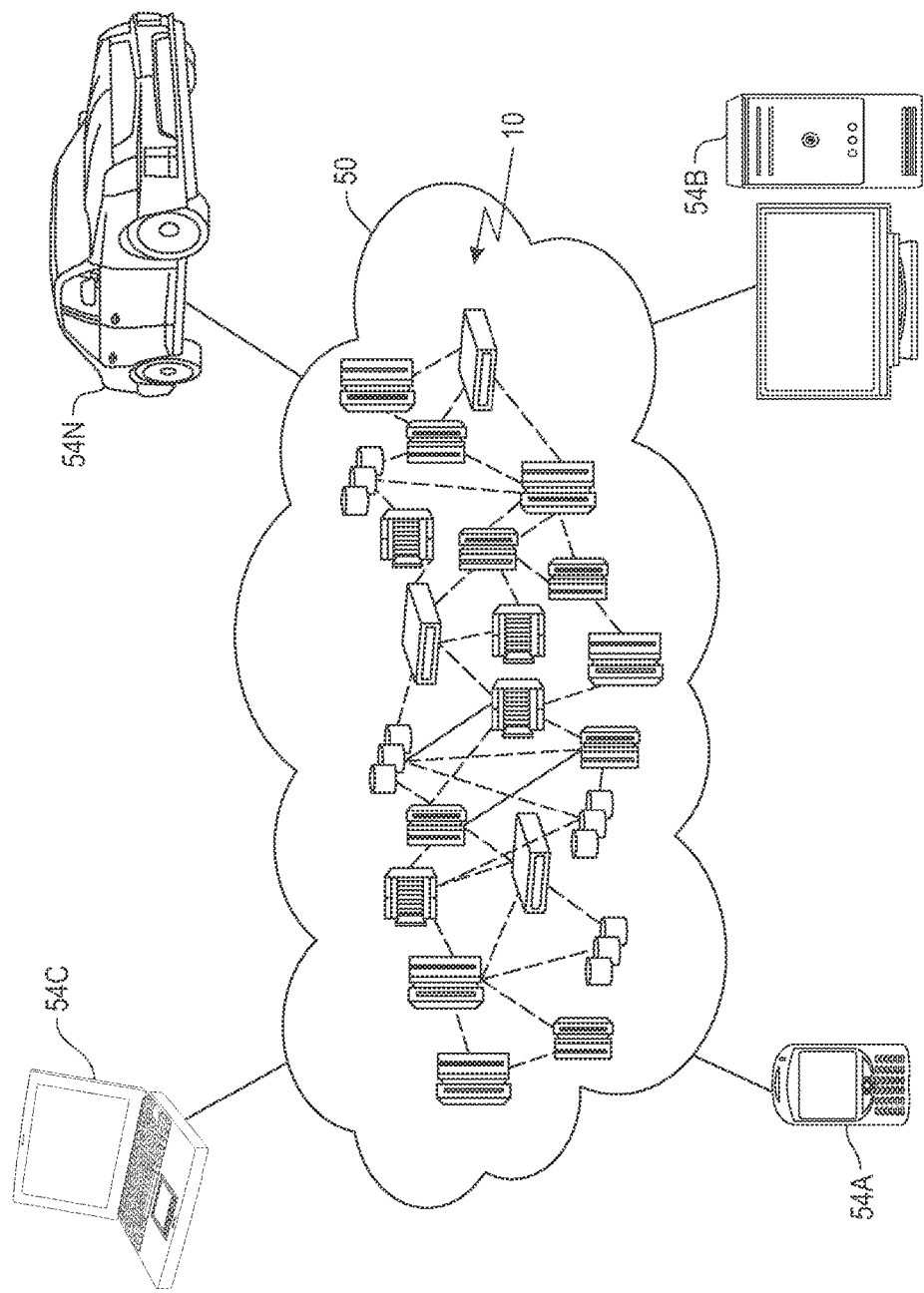
FIG. 2 shows a cloud computing environment, according to an embodiment of the present invention.

Referring now to FIG. 2, illustrative cloud computing environment 50 is depicted. As shown, cloud computing environment 50 comprises one or more cloud computing nodes 10 which may communicate with local computing devices used by cloud consumers, such as, for example, personal digital assistant (PDA) or cellular telephone 54A, desktop computer 54B, laptop computer 54C, and/or automobile computer system 54N. Nodes 10 may communicate with one another. They may be grouped (not shown) physically or virtually, in one or more networks, such as private, community, public, or hybrid clouds as described herein, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
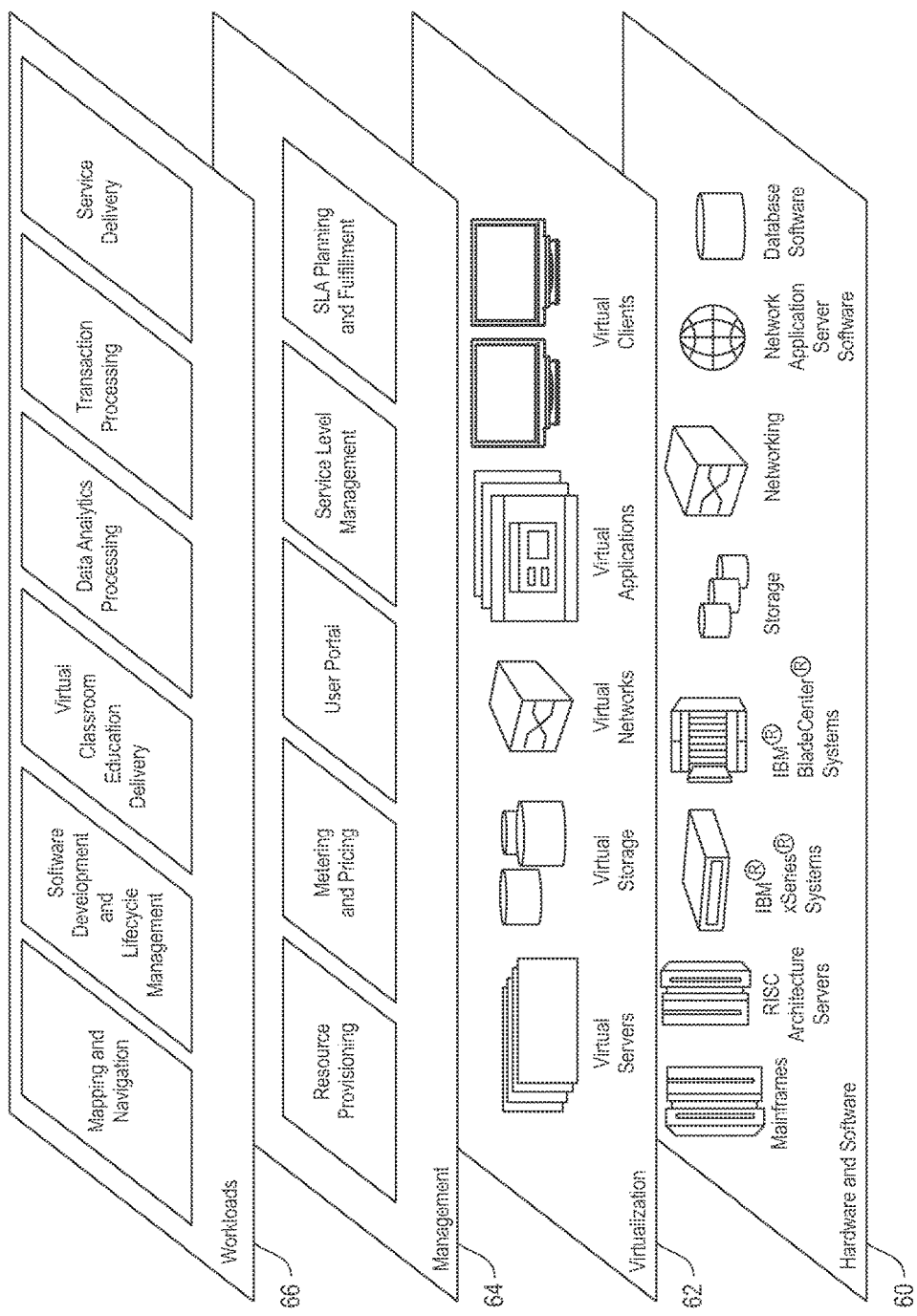
FIG. 3 shows cloud abstraction model layers, according to an embodiment of the present invention.

Referring now to FIG. 3, a set of functional abstraction layers provided by cloud computing environment 50 (FIG. 2) is shown. It should be understood that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network client, in one example IBM WebSphere® client; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation, software development and lifecycle management, virtual classroom education delivery, data analytics processing, transaction processing; etc.

Although one or more embodiments of the invention described herein include cloud computing, implementation of the teachings recited herein are not limited to a cloud computing environment. Rather, embodiments of the present invention are intended to be implemented with any type of networked computing environment known now or later developed.

Figure 4:
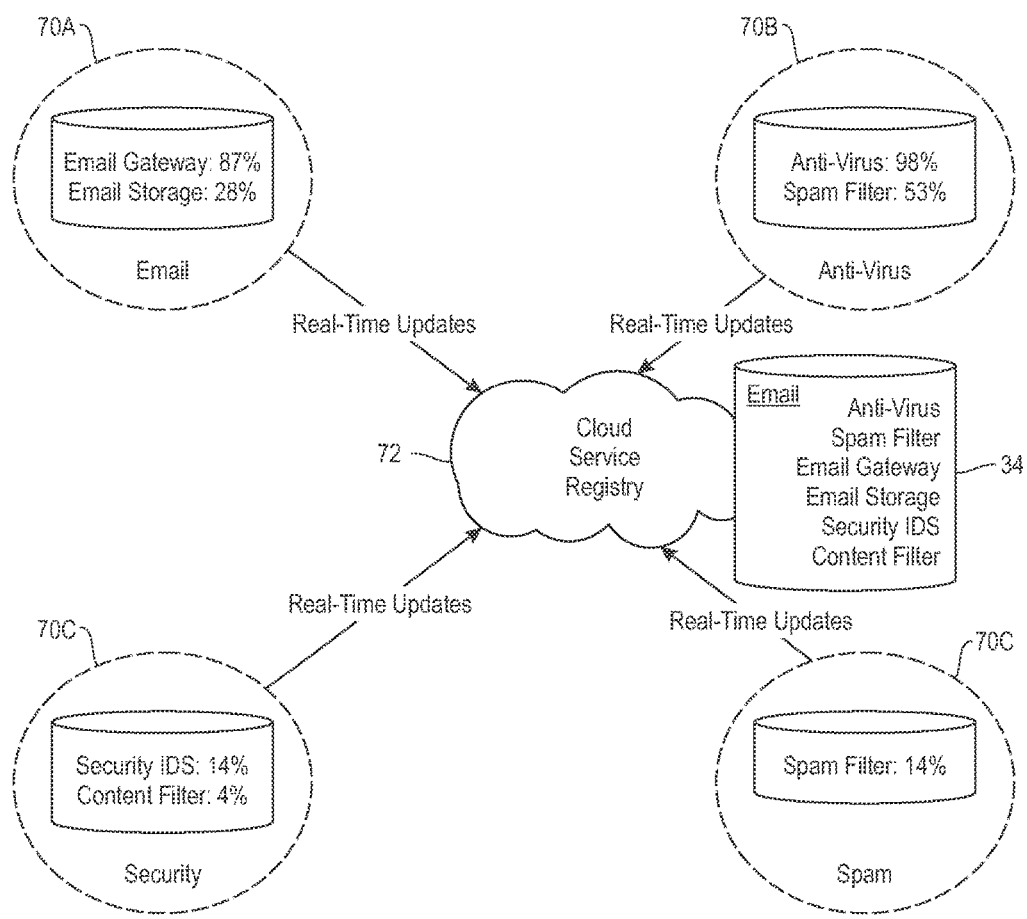
FIG. 4 shows an illustrative central cloud service registry, according to an embodiment of the present invention.

According to an example embodiment of the invention, one aspect includes providing a platform for cloud providers to publish their cloud services via a cloud service registry database. A more detailed example of this is shown in FIG. 4. As depicted, a cloud service registry 72 (which can be implemented as a storage system 34) pulls from different cloud application repositories and updates the cloud service registry 72 with the most recent data provided by the cloud service providers 70A-D. As specifically depicted, real-time updates regarding the available services and their corresponding capabilities can be received from providers 70A-D and be used to build a custom cloud service for (in this example) email.

The cloud service registry 72 would be dynamic by polling different cloud service providers to ensure that the cloud service registry 72 is up-to-date with the latest available cloud services. The cloud service registry 72 would be available for queries from cloud customers or applications deployed by cloud customers to abstract multiple cloud service providers. By abstracting the cloud services, the cloud service registry 72 would create a modular package of different services from different cloud service providers based on the query and requested priority for services. The cloud service registry 72 could be constantly updated based on the level of services that the provider has available. The cloud service registry 72 would determine what service best matches the requirements from a cloud service request (CSR) and return a personalized set of matching services. A weighting system based on the needs of the customer would determine what priorities (mentioned in the CSR) are needed for each customer.

In response to the request, the cloud service registry 72 would build a composite cloud service package based on the different categories of available cloud services that meet the requirements stated in the request from the cloud customer. For example, if a cloud customer requested a desktop publishing service that including requirements for photographic editing, graphic filters, color printing, and PDF creation, the cloud service registry 72 may build a packaged cloud service that included cloud services for photographic editing and PDF creation, cloud services for color printing services, and cloud services for graphic filters from various providers.

The cloud service registry 72 would act as a hub and update its available services in real-time and create a custom cloud service based on the modular needs of the cloud customer. The needs of the client are filled based on specific application requirements.

Figure 5:
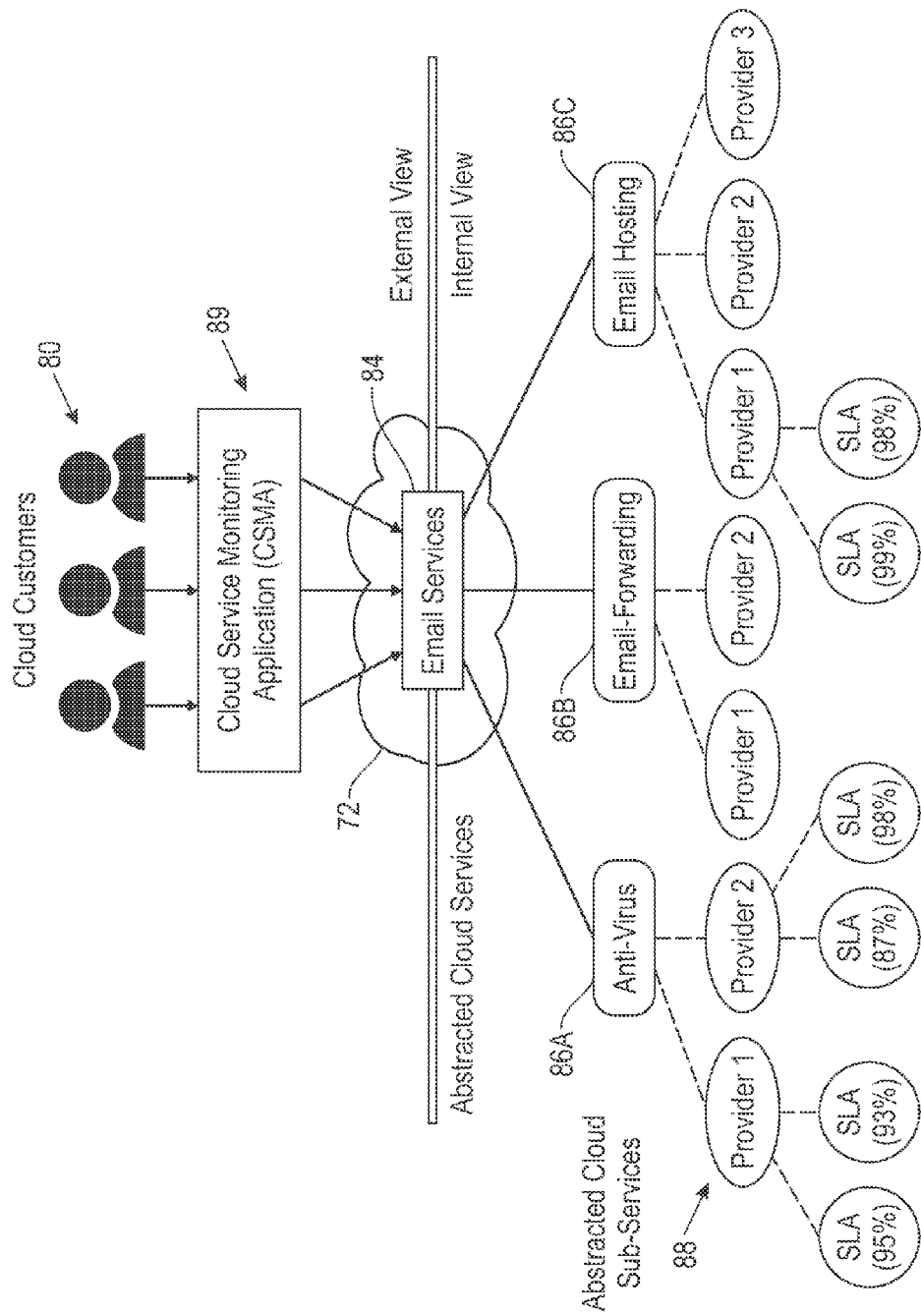
FIG. 5 shows an illustrative example, according to an embodiment of the present invention.

These concepts are further shown in FIG. 5. As depicted, cloud customer 80 (through a Cloud Service Monitoring Application (CSMA) 89, described hereinafter) are attempting to obtain an email service 84, which is a bundle of individual or abstracted cloud (sub)-services 86A-C obtained via a set (one or more) of cloud providers 88. To reach this point, cloud service registry 72 may build a customer cloud package/bundle 84 from Provider-1 for anti-virus, Provider-2 for email forwarding and use Provider-3 for email hosting based on requirements, pricing level, etc., as depicted in the CSR and availability of the cloud services.

The cloud service registry 72 may create a competitive marketplace for cloud application service providers. The marketplace may better connect cloud customers with cloud service providers. This would solve the business problem of customers needing applications that are available on a cloud infrastructure. Without a means of locating cloud services that meet the cloud customer requirements that may include, but are not limited to, performance, availability, scalability, or security, cloud customers may not find a technical solution to their business problem.

Moreover, the dynamic nature of the cloud service registry 72 (similar to a real-time quoting system) may allow customers to choose a custom bundled set of modular applications that are specific to the business based on their requirements for technical functionality and price. Because the cloud services would be abstracted from the customer, the cloud service registry 72 would tailor the cloud service request based on the priority of the cloud customer. The cloud customer receives a custom quote for cloud-based applications based on the CSR. The cloud service providers gain a functional marketplace based on their available capacity and cloud services.

The following are steps for an example embodiment of the invention:

(1) A cloud service taxonomy is created to list the available cloud services. Each part of the cloud service taxonomy may include different parameters or characteristics such as (but not limited to) service level agreements, service level targets, vendor(s), standards, etc.

(2) The cloud service taxonomy is then transposed into the cloud service registry 72. This registry may resemble a hierarchical database structure. This structure will abstract the different services from the possible cloud service providers. Because the cloud customers may search on the cloud service characteristics (based on their business need) and services, the abstraction is used to hide the different cloud providers. This may help ensure that the query results meet the needs of the customer, not the needs of the cloud service provider.

(3) The cloud service registry 72 may be open, standards-based, and use extensible markup language (XML) to be compatible with most registries.

(4) The cloud service providers may access the cloud service registry 72 and input their cloud service provider information.

(5) The cloud service registry 72 would have therein latest updates on available services, pricing, SLA information, and application functionality from different cloud service providers.

(6) In the event that the CSR is received in the cloud service registry 72 for a cloud customer requiring to access or monitor a specific business service that is available via cloud computing, the CSMA 89 would search the cloud service registry 72 for the availability of this service. The CSMA 89 may be a thin (web browser) or thick (local application) client operable to establish a connection with the cloud service registry 72 to submit the CSR at the cloud service registry 72. The request may be transposed into XML and then routed to the registry.

(7) The CSR includes the name of the cloud service, sub-service, and any SLA requirements.

The second component, according to an example embodiment of the invention is the CSMA 89. A cloud customer may provide the CSMA 89 with CSR comprising all the details of the existing cloud services being accessed by it that are provided by existing cloud service providers. The CSR may comprise various technical parameters and SLA parameters such as cost, availability, etc. of the existing cloud service being utilized along with weightages assigned to each parameter by the cloud customer and expected parameters from a new cloud service provider. The CSMA 89 may edit the CSR to include cloud service parameters which are superior to the existing cloud service parameters in CSR. If the expected or superior parameters for a new cloud service from the new cloud service providers are not provided by the cloud customer, the CSMA 89 may be configured to calculate it. For example, if the cost of a particular existing cloud service is X, the CSR would include the cost as X-n, wherein n would be a minimum decrement in the current cost of the existing cloud service. Alternatively, the CSMA 89 would create a CSR similar to the parameters of the existing cloud service and process the quote or output (described hereinafter, received from the cloud service registry 72 corresponding to the input CSR) to decide whether the output from the cloud service registry 72 is a cloud service superior to the existing cloud service. This processing, preferably, also includes determining, from the availability parameter of the output from the cloud service registry 72, whether downtime is involved and if so, how much, in migrating to a new cloud service provider. If the availability parameter of the output from the cloud service registry 72 indicates availability as immediate, zero downtime may be presumed and a live migration of the existing cloud services to the new cloud service provider may be performed through one or more software applications (such as VMWare® Hypervisor) already known to a person skilled in the art.

The CSMA 89, in order to monitor availability of a cloud service better than the existing cloud service, submits the CSR to the cloud service registry 72. The cloud service registry 72 would take the CSR, filter the requirements and priorities of the request and, by abstracting the cloud service providers from the customer, build a modular and specific cloud service quote and send it back to the CSMA 89. The CSMA 89, as mentioned above, based on the type of the CSR, decides whether the quote received from the cloud service registry 72 is better than the existing cloud services being utilized by the cloud customer. For example, if the CSR did already include parameters superior than the existing cloud service and if the quote from the cloud service registry 72 includes parameters which are a match or superior to the parameters of the cloud service in the CSR, there is no further need by the CSMA 89 to process or analyze the quote from the cloud service registry 72. However, if the CSR included parameters similar to the parameters of the existing cloud service, the CSMA 89 would process the quote from the cloud service registry 72 to decide whether the quote from the cloud service registry 72 is a cloud service superior to the existing cloud service. As described herein, downtime involved in migrating the existing cloud service from the existing cloud service providers is also determined.

The aforementioned information about the availability of the superior cloud service (along with downtime, if any) is then routed to the cloud customer 80 by the CSMA 89, suggesting the cloud customer that a better cloud service is available along with the details of the new cloud provider. Permission is sought from the cloud customer 80 to begin migration of the existing cloud service from the existing cloud service providers to the new cloud service providers (as mentioned in the quote). The migration may be performed by one of the already available tools (software applications) known to a person skilled in the art.

Figure 6:
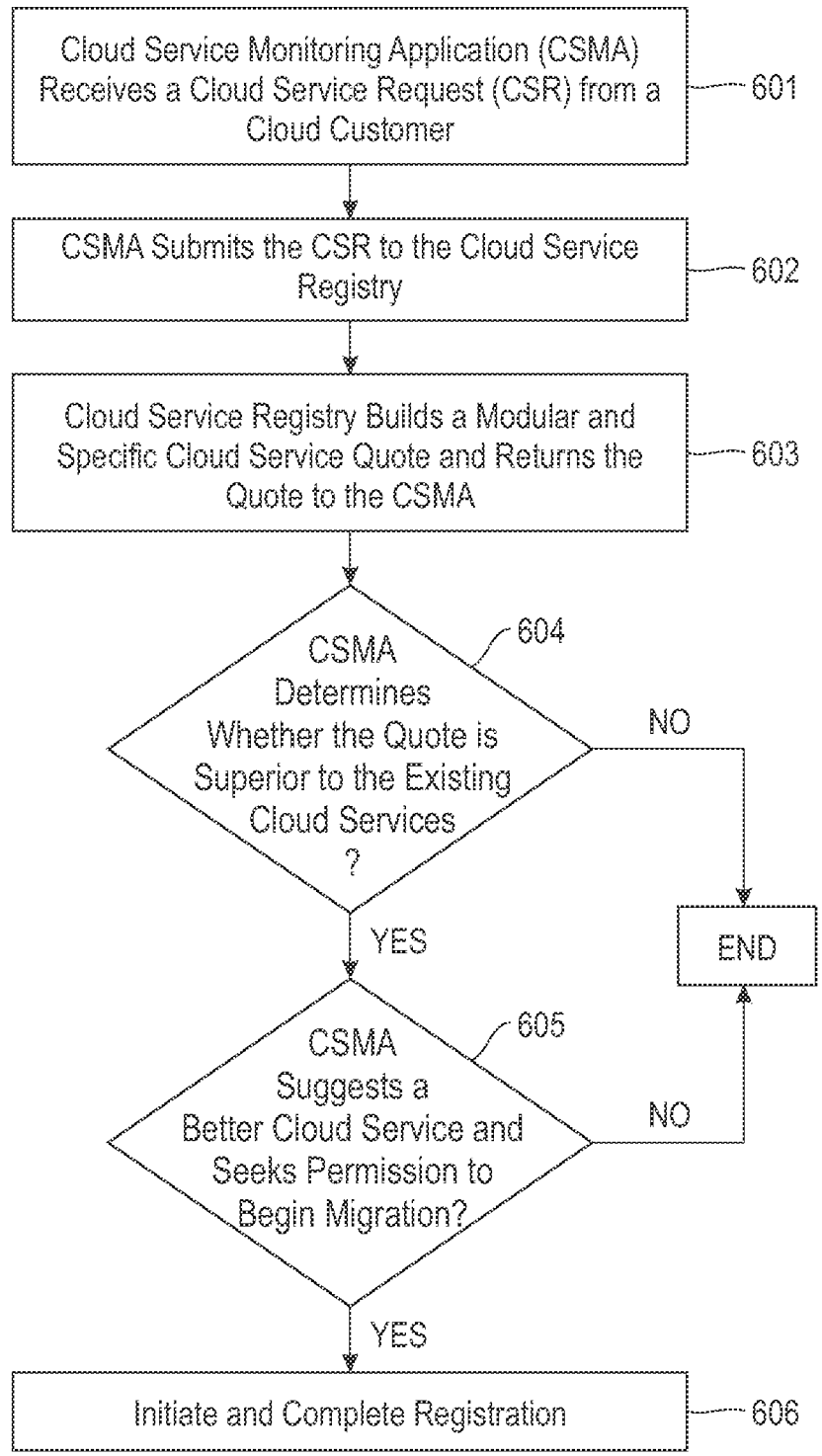
FIG. 6 depicts a method flow diagram according to an embodiment of the present invention.

Referring now to FIG. 6, a method flow diagram according to the present invention is shown. At step 601, a cloud customer already accessing an existing cloud service from existing cloud service providers may provide the CSMA with CSR including all of the details of the existing cloud services being utilized. The CSR may comprise various technical parameters and SLA parameters such as cost, availability, etc. of the existing cloud service being utilized along with weightages assigned to each parameter by the cloud customer and expected parameters from a new cloud service provider. The CSMA may edit the CSR to include cloud service parameters which are superior to the existing cloud service parameters in the CSR. If the expected or superior parameters for a new cloud service from the new cloud service providers are not provided by the cloud customer, the CSMA may be configured to calculate it. For example, if the cost of a particular existing cloud service is X, the CSR would include the cost as X-n, wherein n would be a minimum decrement in the current cost of the existing cloud service. Alternatively, the CSMA would create a CSR similar to the parameters of the existing cloud service and process the quote or output (described hereinafter, received from the cloud service registry corresponding to the input CSR) to decide whether the output from the cloud service registry is a cloud service superior to the existing cloud service. This processing, as noted above, also includes determining, from the availability parameter of the output from the cloud service registry, whether downtime is involved and if so, how much, in migrating to a new cloud service provider. If the availability parameter of the output from the cloud service registry indicates availability as immediate, zero downtime may be presumed and a live migration of the existing cloud services to the new cloud service provider may be performed through one or more software applications already known to a person skilled in the art.

At step 602, the CSMA, in order to monitor the availability of a cloud service better than the existing cloud service, submits the CSR to the cloud service registry.

At step 603, the cloud service registry would take the CSR, filter the requirements and priorities of the request and, by abstracting the cloud service providers from the customer, build a modular and specific cloud service quote and send it back to the CSMA.

At step 604, the CSMA based on the type of the CSR, decides whether the quote received from the cloud service registry is better than the existing cloud services being utilized by the cloud customer. For example, if the CSR did already include parameters superior than the existing cloud service and if the quote from the cloud service registry includes parameters which are a match or superior to the parameters of the cloud service in the CSR, there is no further need by the CSMA to process or analyze the quote from the cloud service registry. However, if the CSR had parameters similar to the parameters of the existing cloud service, the CSMA would process the quote from the cloud service registry to decide whether the quote from the cloud service registry is a cloud service superior to the existing cloud service. As described above, downtime involved in migrating the existing cloud service from the existing cloud service providers is also determined.

At step 605, the aforementioned information about the availability of the superior cloud service (along with downtime, if any) is then routed to the cloud customer by the CSMA, suggesting to the cloud customer that a better cloud service is available, along with the details of the new cloud provider. Permission is sought from the cloud customer to begin migration of the existing cloud service from the existing cloud service providers to the new cloud service providers (as mentioned in the quote). At step 606, if the permission is received, the migration may be performed by one of the already available tools (software applications) known to a person skilled in the art.

While shown and described herein as a cloud service delivery optimization solution, it is understood that the invention further provides various alternative embodiments. For example, in one embodiment, the invention provides a computer-readable/useable medium that includes computer program code to enable a computer infrastructure to provide cloud service delivery optimization functionality as discussed herein. To this extent, and as further described herein, the computer-readable/useable medium includes program code that implements each of the various processes of the invention.

In another embodiment, the invention provides a method that performs the process of the invention on a subscription, advertising, and/or fee basis. That is, a service provider, such as a Solution Integrator, could offer to provide cloud service delivery optimization. In this case, the service provider can create, maintain, support, etc., a computer infrastructure, such as computer system 12 (FIG. 1) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing cloud service delivery optimization functionality. In this case, a computer infrastructure, such as computer system 12 (FIG. 1), can be provided, and one or more systems for performing the process of the invention can be obtained (for example, created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, and as further described herein, program code can be embodied as one or more of: an application/software program, component software/a library of functions, an operating system, a basic device system/driver for a particular computing device, and the like.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for optimizing cloud service delivery within a cloud computing environment, the method comprising:
   receiving a cloud service request (CSR) from a cloud customer in the cloud computing environment, the cloud service request comprising at least one parameter of one or more existing cloud services accessed by the cloud customer that are provided by one or more existing cloud service providers;
   monitoring the at least one parameter of the CSR in a cloud service registry, the cloud service registry comprising:
      (i) a plurality of cloud services provided by a plurality of cloud service providers; and
      (ii) one or more parameters corresponding to each cloud service of the plurality of cloud services;
   based on said monitoring, determining a new cloud service provider having an improvement, related to the at least one monitored parameter, in comparison to the one or more existing cloud service providers, wherein the improvement includes a cost of X-n, wherein X represents the cost of the lowest-cost cloud service provider among the one or more existing cloud service providers, and wherein n represents a pre-determined minimum decrement amount;
   determining (i) availability of the new cloud service provider, (ii) a cost of migrating the one or more existing cloud services to the new cloud service provider, and (iii) downtime of the cloud services accessed during said migration;
   routing, to the cloud customer, (i) one or more details describing the new cloud service, (ii) the determined availability of the new cloud service provider, (iii) the determined cost of migrating the one or more existing cloud services to the new cloud service provider, (iv) the determined downtime of the cloud services accessed during said migration, and (v) a request for permission to migrate the one or more existing cloud services to the new cloud service provider; and
   upon receipt of an affirmative response from the cloud customer to the request, migrating the one or more existing cloud services to the new cloud service provider within the cloud computing environment.

2. The method of claim 1, wherein the at least one parameter of the CSR includes one or more of the following parameters: one or more technical parameters of the one or more existing cloud services, one or more service level agreement (SLA) parameters of the one or more existing cloud services, one or more weightages assigned to each parameter of the one or more existing cloud services, and one or more expected parameters from the new cloud service provider.

3. The method of claim 1, wherein said determining is based on comparing the at least one parameter of the CSR to the corresponding one or more parameters provided by the plurality of cloud service providers in the cloud service registry.

4. The method of claim 1, wherein the improvement further includes superior technical efficacy compared to the one or more existing cloud services.

5. A system implemented in hardware for optimizing cloud service delivery within a cloud computing environment, the system comprising a memory and at least one processor operably coupled to the memory and configured to:

receive a cloud service request (CSR) from a cloud customer in the cloud computing environment, the cloud service request comprising at least one parameter of one or more existing cloud services accessed by the cloud customer that are provided by one or more existing cloud service providers;

monitor the at least one parameter of the CSR in a cloud service registry, the cloud service registry comprising:
(i) a plurality of cloud services provided by a plurality of cloud service providers; and
(ii) one or more parameters corresponding to each cloud service of the plurality of cloud services;

based on said monitoring, determine a new cloud service provider having an improvement, related to the at least one monitored parameter, in comparison to the one or more existing cloud service providers, wherein the improvement includes a cost of X-n, wherein X represents the cost of the lowest-cost cloud service provider among the one or more existing cloud service providers, and wherein n represents a pre-determined minimum decrement amount;

determine (i) availability of the new cloud service provider, (ii) a cost of migrating the one or more existing cloud services to the new cloud service provider, and (iii) downtime of the cloud services accessed during said migration;

route, to the cloud customer, (i) one or more details describing the new cloud service, (ii) the determined availability of the new cloud service provider, (iii) the determined cost of migrating the one or more existing cloud services to the new cloud service provider, (iv) the determined downtime of the cloud services accessed during said migration, and (v) a request for permission to migrate the one or more existing cloud services to the new cloud service provider; and upon receipt of an affirmative response from the cloud customer to the request, migrate the one or more existing cloud services to the new cloud service provider within the cloud computing environment.

6. The system of claim 5, wherein the at least one parameter of the CSR includes one or more of the following parameters: one or more technical parameters of the one or more existing cloud services, one or more service level agreement (SLA) parameters of the one or more existing cloud services, one or more weightages assigned to each parameter of the one or more existing cloud services, and one or more expected parameters from the new cloud service provider.

7. The system of claim 5, wherein said determining is based on comparing the at least one parameter of the CSR to the corresponding one or more parameters provided by the plurality of cloud service providers in the cloud service registry.

8. The system of claim 5, wherein the improvement further includes superior technical efficacy compared to the one or more existing cloud services.

9. A computer program product comprising a computer usable storage medium having readable program code embodied in the storage medium, wherein the readable program code is executable by a computing device to cause the computing device to:

receive a cloud service request (CSR) from a cloud customer in the cloud computing environment, the cloud service request comprising at least one parameter of one or more existing cloud services accessed by the cloud customer that are provided by one or more existing cloud service providers;

monitor the at least one parameter of the CSR in a cloud service registry, the cloud service registry comprising:
(i) a plurality of cloud services provided by a plurality of cloud service providers; and
(ii) one or more parameters corresponding to each cloud service of the plurality of cloud services;

based on said monitoring, determine a new cloud service provider having an improvement, related to the at least one monitored parameter, in comparison to the one or more existing cloud service providers, wherein the improvement includes a cost of X-n, wherein X represents the cost of the lowest-cost cloud service provider among the one or more existing cloud service providers, and wherein n represents a pre-determined minimum decrement amount;

determine (i) availability of the new cloud service provider, (ii) a cost of migrating the one or more existing cloud services to the new cloud service provider, and (iii) downtime of the cloud services accessed during said migration;

route, to the cloud customer, (i) one or more details describing the new cloud service, (ii) the determined availability of the new cloud service provider, (iii) the determined cost of migrating the one or more existing cloud services to the new cloud service provider, (iv) the determined downtime of the cloud services accessed during said migration, and (v) a request for permission to migrate the one or more existing cloud services to the new cloud service provider; and upon receipt of an affirmative response from the cloud customer to the request, migrate the one or more existing cloud services to the new cloud service provider within the cloud computing environment.

10. The computer program product of claim 9, wherein the at least one parameter of the CSR includes one or more of the following parameters: one or more technical parameters of the one or more existing cloud services, one or more service level agreement (SLA) parameters of the one or more existing cloud services, one or more weightages assigned to each parameter of the one or more existing cloud services, and one or more expected parameters from the new cloud service provider.

11. The computer program product of claim 9, wherein said determining is based on comparing the at least one parameter of the CSR to the corresponding one or more parameters provided by the plurality of cloud service providers in the cloud service registry.

12. The computer program product of claim 9, wherein the improvement further includes superior technical efficacy compared to the one or more existing cloud services.

* * * * *